United States Patent [19]

Miller

[11] 4,392,695

[45] Jul. 12, 1983

[54] BEARING

[75] Inventor: Maurice E. Miller, Stratton, Nebr.

[73] Assignee: Miller Manufacturing Company, Grand Island, Nebr.

[21] Appl. No.: 291,240

[22] Filed: Aug. 10, 1981

[51] Int. Cl.³ .............................................. F16C 33/78
[52] U.S. Cl. .................................. 308/187.2; 308/181
[58] Field of Search ................. 308/187.1, 187.2, 36.1, 308/181; 277/95, 96.2, 212 F, 228, 1, 188 R, 227, 186, 181, DIG. 4, 229, 231

[56] References Cited

U.S. PATENT DOCUMENTS

| | | | |
|---|---|---|---|
| 2,554,488 | 5/1951 | Carr | 277/96.2 |
| 2,907,612 | 10/1959 | White | 277/212 F |
| 3,389,921 | 6/1968 | Lojkutz | 277/96.2 |
| 3,639,016 | 2/1972 | Bourgeois | 277/95 |

Primary Examiner—Lenard A. Footland
Attorney, Agent, or Firm—Zarley, McKee, Thomte, Voorhees & Sease

[57] ABSTRACT

A bearing is described for use with a disc harrow including means for preventing dust from entering the interior thereof. The bearing comprises inner and outer bearing rings having a plurality of spaced apart ball bearings mounted therebetween. First and second ring shaped seals are positioned between the inner and outer bearing rings at the opposite sides thereof. First and second ringshaped shroud caps embrace the first and second seals, respectively, for maintaining the seals in position. A sealant material is positioned between the inner and outer bearing rings at each side thereof so as to prevent soil from entering the interior of the bearing between the shroud caps and the outer bearing ring, and from reaching the primary bearing seal area.

8 Claims, 5 Drawing Figures

BEARING

BACKGROUND OF THE INVENTION

This invention relates to a bearing and more particularly to a bearing especially designed to prevent dust from entering the interior thereof.

Discs or disc harrows as they are sometimes called obviously are used in very dusty conditions. Ordinarily, the disc sections are supported from a frame means by means of some type of bearings which embrace the shafts of the disc sections or the bearing spools. The bearings are normally mounted at the lower end of supporting arms or the like which extend downwardly from the frame means.

Many attempts have been made to prevent dust and/or soil from entering the interior of the bearings since the abrasive nature of the dust or soil greatly reduces the life of the bearings. For example, Fafnir Bearing Division of Textron, Inc. has provided a bearing including a flexible ring-shaped seal at each side of the bearing which is designed to frictionally engage the exterior surface of the inner bearing ring to prevent dust from entering the interior of the bearing at the periphery of the inner bearing ring. The bearing seals are normally held in position by metal shroud caps which are received in a groove formed in the outer bearing ring. However, it has been found that dust or soil still enters the interior of the bearing since it is practically economically impossible to seal the exterior portion of the shroud cap to the outer bearing ring and there is seldom a tight and complete seating of the shroud caps into the outer ring. Also, the constant bombardment of soil is sufficient to allow some soil to enter the bearing past the flexible multiple lip seals that are used.

Therefore, it is a principal object of the invention to provide a bearing having an improved means for prevent dust and/or soil from entering the interior thereof.

A further object of the invention is to provide a bearing especially designed for use with a disc harrow.

A further object of the invention is to provide a bearing which not only prevents dust or the like from entering the interior of the bearing but which also includes means for maintaining the grease or lubricant therein.

A still further object of the invention is to provide a bearing of the type described which is economical of manufacture, durable in use, and which provides efficient sealing of standard production bearings.

These and other objects will be apparent to those skilled in the art.

SUMMARY OF THE INVENTION

The bearing of this invention comprises inner and outer bearing rings having ball bearing positioned therebetween in conventional fashion. First and second flexible seals embrace the exterior surface of the inner bearing ring. Shroud caps are mounted at opposite sides of the bearing for maintaining the first and second seals in position. The shroud caps define annular grooves at opposite sides of the bearing. The annular grooves are filled with a sealant material which prevents soil from entering the interior of the bearing at the point between the shroud caps and the other bearing ring and which also maintain the grease in the bearing. The sealant material is preferably comprised of a silicone rubber having felt or a similar type material embedded in the exterior surface thereof, making a bonded unit which permanently adheres to the bearing. Washers are positioned outwardly of the sealant material which compresses the sealant material in the annular grooves. These washers also protect the flexible bearing seal which engages the inner ring of the bearing by protecting it from the bombarding of soil at the exterior of the flexible seal contact point. This seal is further protected from soil by the compressed felt-type material which has been bonded to the sealant in the annular grooves. This compressed area prevents soil from getting to the primary seals and thereby greatly reduces their workload and increases their efficiency. The compressed felt-type material receives lubrication from the greasing of the bearing wherein the bearing is greased to the extent that when the bearing is full that the excess grease exits the bearing through the flexible seals, thence going past the compressed felt-type material to lubricate this material and to help purge this area of any accumulated soil.

The steel washers that are positioned outwardly of each side of the bearing are of the same bore size as the bearing. The bearing and washers are set either on a round shaft or an adapter sleeve, depending on the machine type. The washers are clamped tightly against the inner bearing ring by the tightening of a nut on the shaft end which tightens the bearing spools against both sides of the bearing-washer unit.

DESCRIPTION OF THE PREFERRED EMBODIMENT

Figure 1:
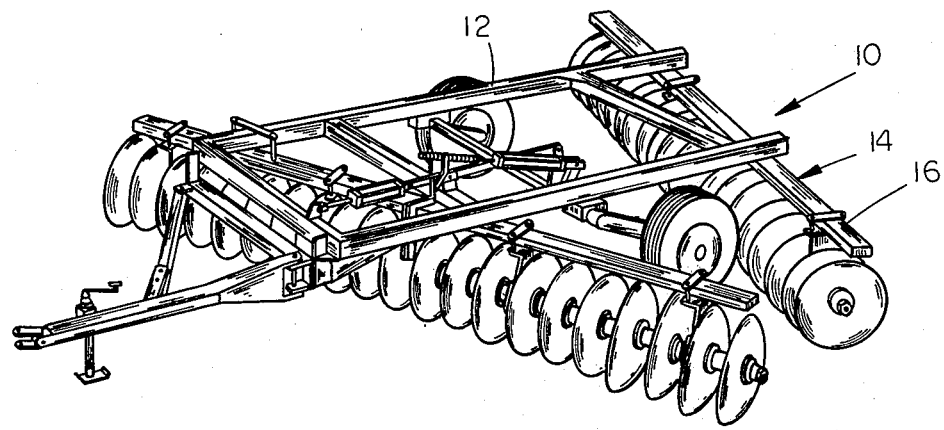
FIG. 1 is a perspective view of a typical disc harrow.
Figure 2:
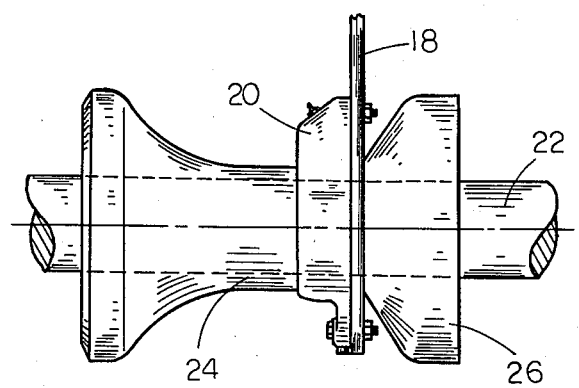
FIG. 2 is a plan view illustrating one means of mounting the bearing on the disc.

In FIG. 1, a typical disc or disc harrow is generally designated by the reference numeral 10. Disc 10 includes a frame 12 having a plurality of disc sections 14 mounted thereon. Each of the disc sections 14 includes a frame member 16 which is secured to the frame means 12 and which has a plurality of bearing brackets 18 extending downwardly therefrom which have bearings 20 at the lower end thereof. The bearings 20 are designed to embrace the shaft 22 in conventional fashion. In FIG. 2, the numerals 24 and 26 refer to typical bearing spools.

Figure 3:
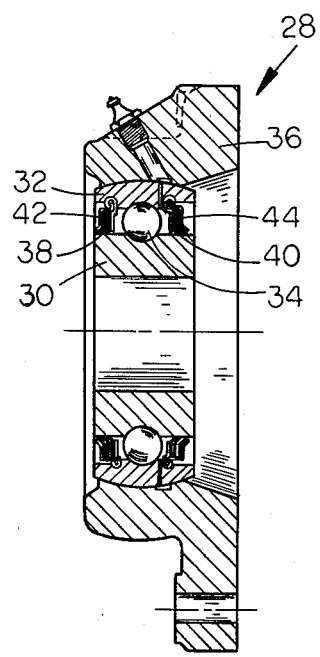
FIG. 3 is a sectional view of a prior art bearing.

FIG. 3 illustrates a prior art bearing such as that manufactured by Fafnir Bearing Division of Textron. The bearing of FIG. 3 is referred to by the reference numeral 28. Although a Fafnir bearing has been illustrated, the sealing means disclosed hereinafter will work equally well in other types of bearings. Bearing 28 includes inner and outer bearing rings 30 and 32 respectively having a plurality of ball bearings 34 positioned therebetween in conventional fashion. The outer ring 32 is mounted in a bearing housing 36 in conventional fashion.

Flexible ring-shaped seals 38 and 40 are positioned at the opposite sides of the bearing and are designed to frictionally engage the exterior surface of inner bearing ring 30. Seals 38 and 40 are maintained in position by shroud caps 42 and 44 as seen in the drawings. The outer end of the shroud caps 42 and 44 are received within grooves formed in the outer bearing ring 32.

In the prior art device of FIG. 3, it has been found that dust will enter the interior of the bearing at the point where the shroud caps 42 and 44 are received by the outer bearing ring. It is the bearing of FIG. 3 that applicant has modified so as not only to provide dust from entering the interior of the bearing but to maintain the grease or lubricant therein.

Figure 5:
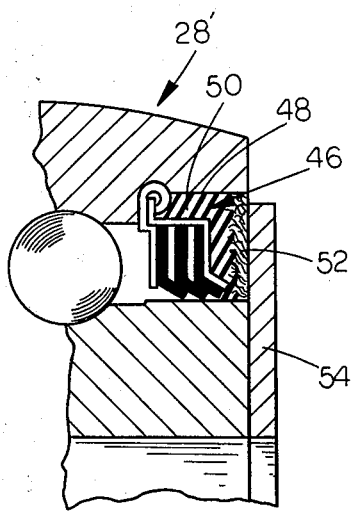
FIG 5 is an exploded partial sectional view of the embodiment of FIG. 4.
Figure 4:
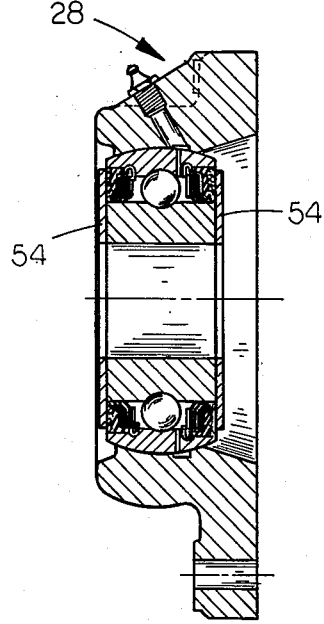
FIG. 4 is a sectional view similar to that of FIG. 4 except that the bearing of FIG. 3 has been modified to prevent the entry of dust therein.

In FIGS. 4 and 5, the numeral 28' refers to the modified bearing. The modified bearing 28' of FIGS. 4 and 5 is identical to the prior art bearing of FIG. 3 except that a sealant material 46 is positioned in each of the annular grooves 48. The annular grooves 48 are provided at opposites of the bearing and are defined by the shroud caps and the bearing rings as best illustrated in FIG. 5. The sealant material 46 is preferably comprised of a silicone rubber referred to generally by the reference numeral 50. The entire groove may be filled with the silicone rubber if desired. However, the preferred embodiment of the sealant material includes felt-type material 52 which is embedded in the exterior portion of the silicone rubber 50 prior to the rubber 50 completely curing. In other words, the silicone rubber 50 is positioned in the groove and the felt-type material is then pressed or forced into the exterior portion of the silicone rubber. The silicone rubber 50 is then allowed to dry or cure.

In use, the bearing 28' is mounted on the shaft 22 and would have a pair of washers 54 positioned at each side of the bearing. The washers 54 are forced against the sealant material by the bearing spools 24 and 26 which causes the felt and silicone rubber to be compressed which further aids in sealing the interior of the bearing and protects and flexible seal area. In other words, the compression of the sealant material 46 by the washers 54 causes the sealant materal to effectively seal the exterior of the shroud caps so that dust cannot pass into the interior of the bearings. The sealant material not only aids in preventing dust from entering the interior of the bearings but also effectively prevents grease from passing outwardly from the interior of the bearings.

Thus it can be seen that a novel bearing has been described which accomplishes at least all of its stated objectives.

I claim:

1. A bearing, comprising,
an inner bearing ring having a central opening for receiving a shaft therein, said inner ring having inner and outer surfaces and opposite sides,
an outer bearing ring spaced from said inner ring and having inner and outer surfaces and opposite sides,
a plurality of spaced apart ball bearings between said inner and outer bearing rings,
a first ring-shaped seal between said inner and outer bearing rings at one side thereof,
a second ring-shaped seal between said inner and outer bearing rings at the other side thereof,
said first and second seals embracing and frictionally engaging the outer surface of said inner bearing ring,
a first ring-shaped shroud cap secured to said outer bearing ring at one side thereof and embracing said first seal, said first shroud cap and said outer bearing ring defining a first annular groove,
a second ring-shaped shroud cap secured to said outer bearing ring at the other side thereof and embracing said second seal, said second shroud cap and said outer bearing ring defining a second annular groove,
and a compressible sealant material in said first and second grooves,
said sealant material substantially filling said grooves and being compressible against said shroud cap to prevent dust from entering the interior of the bearing between said first and second seal means and said bearing rings.

2. The bearing of claim 1 wherein said sealant material comprises a flexible silicone material.

3. The bearing of claim 1 wherein said sealant material comprises a resilient material.

4. A bearing, comprising,
an inner bearing ring having a central opening for receiving a shaft therein, said inner ring having inner and outer surfaces and opposite sides,
an outer bearing ring spaced from said inner ring and having inner and outer surfaces and opposite sides,
a plurality of spaced-apart ball bearings between said inner and outer bearing rings,
a first seal means between said inner and outer bearing rings at one side thereof,
a second seal means between said inner and outer bearing rings at the other side thereof,
said first seal means and said inner and outer bearing rings defining a first annular groove,
said second seal means and said inner and outer bearing rings defining a second annular groove,
and a compressible sealant material in each of said first and second grooves and substantially filling the same and being compressible against the said seal means to prevent dust from entering the interior of the bearing between said seal means and said bearing rings.

5. A bearing comprising,
an inner bearing ring having a central opening for receiving a shaft therein, said inner ring having inner and outer surfaces and opposite sides,
an outer bearing ring spaced from said inner ring and having inner and outer surfaces and opposite sides,
a plurality of spaced apart ball bearings between said inner and outer bearing rings,
a first ring-shaped seal between said inner and outer bearing rings at one side thereof,
a second ring-shaped seal between said inner and outer bearing rings at the other side thereof,
said first and second seals embracing and frictionally engaging the outer surface of said inner bearing ring,
a first ring-shaped shroud cap secured to said outer bearing ring at one side thereof and embracing said first seal, said first shroud cap and said outer bearing ring defining a first annular groove,
a second ring-shaped shroud cap secured to said outer bearing ring at the other side thereof and embracing said second seal, said second shroud cap and said outer bearing ring defining a second annular groove,
and a sealant material in said first and second grooves to prevent dust from entering the interior of the bearing between said shroud caps and said outer bearing ring,
said sealant material comprising a flexible silicone material,
said material further comprising a felt-type material embedded in said silicone material.

6. The bearing of claim 5 wherein said felt-type material is embedded in the outer ends of said silicone material.

7. The bearing of claim 6 wherein a washer is positioned outwardly of each of said grooves for compressing said felt-type material and for shielding the bearing seal area.

8. A bearing, comprising,
an inner bearing ring having a central opening for receiving a shaft therein, said inner ring having inner and outer surfaces and opposite sides,
an outer bearing ring spaced from said inner ring and having inner and outer surfaces and opposite sides,
a plurality of spaced apart ball bearings between said inner and outer bearing rings,
a first ring-shaped seal between said inner and outer bearing rings at one side thereof,
a second ring-shaped seal between said inner and outer bearing rings at the other side thereof,
said first and second seals embracing and frictionally engaging the outer surface of said inner bearing ring,
a first ring-shaped shroud cap secured to said outer bearing ring at one side thereof and embracing said first seal, said first shroud cap and said outer bearing ring defining a first annular groove,
a second ring-shaped shroud cap secured to said outer bearing ring at the other side thereof and embracing said second seal, said second shroud cap and said outer bearing ring defining a second annular groove,
and a sealant material in said first and second grooves to prevent dust from entering the interior of the bearing between said shroud caps and said outer bearing ring,
said sealant material comprising a resilient material,
and a felt-type material embedded in said resilient material.

* * * * *